3,654,204
5-HYDROXY - 2-(SUBSTITUTED)THIENO[2,3-d]PYRIMIDINE-6-CARBOXYLIC ACID DERIVATIVES

Dong H. Kim, Wayne, and Arthur A. Santilli, Havertown, Pa., assignors to American Home Products Corporation, New York, N.Y.
No Drawing. Filed Nov. 4, 1969, Ser. No. 874,033
Int. Cl. C07d 51/46
U.S. Cl. 260—251 A    5 Claims

ABSTRACT OF THE DISCLOSURE 5-hydroxy - 2 - (substituted)thieno[2,3-d]pyrimidine-6-carboxylic acid derivatives (I) useful as CNS depressants in the calming of animals are disclosed as well as methods of synthesizing the compounds (I) by contacting a pyrimidine (IV) with a strong base. The CNS depressant compound 5-hydroxy-2-phenylthieno[2,3-d]pyrimidine-6-carboxanilide is produced by refluxing 2-phenyl-4-[(phenylcarbamoyl)methylthio] - 5 - pyrimidinecarboxylic acid, ethyl ester with sodium in 2-ethoxyethanol.

---

This invention relates to new and novel 5-hydroxy and 5-substituted-hydroxy - 2 - (substituted)thieno[2,3-d]pyrimidine-6-carboxylic acid derivatives. Additionally, this invention relates to the methods and intermediate used in the synthesis of the aforementioned compounds.

The compounds of the present invention have the formula:

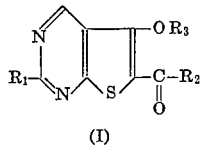

(I)

wherein $R_1$ is selected from the group consisting of lower alkyl, lower alkylthio, phenyl, p-halophenyl, lower alkylphenyl, lower alkoxyphenyl, phen(lower)alkyl, halophenyl(lower)alkyl and lower alkoxy(lower)alkyl; $R_2$ is selected from the group consisting of lower alkoxy, anilino and naphthylamino; and $R_3$ is selected from the group consisting of hydrogen, lower alkylphensulfonyl, halophenylsulfonyl, lower alkoxyphenylsulfonyl, phenylsulfonyl, phen(lower)alkylsulfonyl, halophenyl(lower)akysufonyl and lower alkylsulfony.

The terms "lower alkyl," "lower alkoxy" and the like, as employed herein, refer to both branched and straight chain moieties containing from one to about six carbon atoms. The term "halo" as employed herein refers to a halogen atom exemplified by chlorine, bromine, iodine and fluorine.

SYNTHESIS

The compounds of Formula I are prepared by reacting a 5-carb(lower)alkoxy-4-chloro-2-substituted-pyrimidine of the formula:

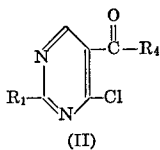

(II)

wherein $R_1$ is as set forth in Formula I and $R_4$ is lower alkoxy, with a mercaptoacetate having the formula:

$$HSCH_2COR_2$$

(III)

wherein $R_2$ is as set forth in Formula I by contacting in a suitable reaction inert organic solvent, such as alkanol (e.g. ethanol), in the presence of a base, such as an alkali metal carbonate or bicarbonate (e.g. sodium, potassium or lithium carbonate or bicarbonate), by heating at about reflux temperature for a period ranging from one hour up to three hours. The resulting compounds are recovered by routine procedures, such as cooling to form a precipitate which is recovered by filtering and recrystallized from an appropriate solvent, such as an alkanol (e.g. ethanol) or a dialkylformamide-water (e.g. dimethylformamide-water) mixture and are of the formula:

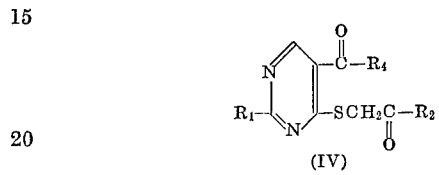

(IV)

wherein $R_1$ and $R_2$ are as in Formula I and $R_4$ is as in Formula II. The expression "reaction inert organic solvent" as used herein refers to an organic solvent or solvent system in which the reaction may take place without being affected thereby. The starting materials (II) are known and may be provided by methods described in D. H. Kim and A. A. Santilli, Chem. & Indust., pp. 458–459 (1969).

The intermediate compounds (IV) are then reacted by contacting with a strong base such as an alkali metal(lower)alkoxide; i.e. wherein the alkali metal may be, for example, sodium, potassium or lithium, i.e. sodium or potassium ethoxide, in a reaction inert organic solvent, such as an alkanol (e.g. ethanol) or an alkoxyalkanol (e.g. 2-ethoxyethanol) by heating at about the reflux temperature for a period of time ranging from about one hour up to about six hours. The resulting compounds are recovered by routine procedures, such as cooling the reaction mixture and precipitating the compounds by the addition of an acid (e.g. glacial acetic acid or hydrochloric acid) and recrystallizing the precipitate from an appropriate solvent such as an alkanol (e.g. methanol) or a dialkylformamide (e.g. dimethylformamide) and have the formula:

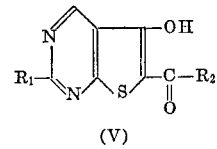

(V)

wherein $R_1$ and $R_2$ are as set forth in Formula I.

The compounds of Formula V may further be reacted by contacting with a substituted sulfonyl chloride of the formula:

$$Cl-SO_2-R_5$$

(VI)

wherein $R_5$ is selected from the group consisting of lower alkylphenyl, halophenyl, lower alkoxyphenyl, phenyl, phen(lower)alkyl, halophenyl(lower)alkyl and lower alkyl in a suitable reaction inert organic solvent (e.g. pyridine) at about room temperature or with gentle heating at up to about reflux temperature for a time period ranging from thirty minutes up to two hours. The resulting product is recovered by routine procedures, for example, by adding the reaction mixture to water forming a precipitate which is collected by filtration and recrystallized from a suitable solvent, such as a di(lower)

alkylformamide (e.g. dimethylformamide) and has the formula:

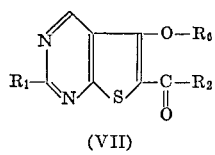

(VII)

wherein $R_1$ and $R_2$ are as set forth in Formula I and $R_6$ is selected from the group consisting of lower alkylphenylsulfonyl, halophenylsulfonyl, lower alkoxyphenylsulfonyl, phenylsulfonyl, phen(lower)alkylsulfonyl, halophenyl-(lower)alkylsulfonyl, and lower alkylsulfonyl.

The compounds of the present invention (I) are central nervous system depressants and are, therefore, useful for producing a calming effect in animals. These compounds (I) are effective when administered orally or intraperitoneally at a dose range of from about 12.70 mg./kg. up to about 400.00 mg./kg. of the animal being treated. The central nervous system depressant activity of these compounds was measured in a test for general central nervous system activity whereby the compounds are administered orally and intraperitoneally to three mice (CF–1; 14 to 24 grams) as a suspension emulsified in an aqueous vehicle with 1% polyethylene oxide sorbiten monoleate at each of the following doses: 400, 127, 40 and 12.7 mg./kg. The animals are watched for a minimum of two hours during which time signs of general stimulation (i.e. increased spontaneous motor activity, hyperactivity on tactile stimulation, twitching), general depression (i.e., decreased spontaneous motor activity, decreased respiration) and autonomic activity (i.e. miosis, mydriasis, diarrhea) are noted. The animals are tested for changes in reflexes (i.e., flexor, extensor) and are rated by use of a pole climb and inclined screen for the presence of sedation-ataxia. A test similar to the "Eddy Hot-Plate Method" [Nathan B. Eddy and Dorothy Leimbach, J. Pharmacol. Exper. 107, 385 (1953)] is used to test for analgesia. The experiment is terminated by subjecting each animal to a maximal electroshock to test for anticonvulsant activity.

When the compounds of the present invention are employed as CNS depressants, they may be prepared in conventional dosage forms. Oral dosage forms would include tablets, pills, capsules, granules, powders, elixirs, oral solutions, oral suspensions, dragees and in admixture with foodstuffs or drinking water. Other dosage forms would include injections and suppositories. For ease of administration, the compositions may be provided in unit dosage forms, in which the medication is provided in a one dose form. These would include the solid or shaped solid dosage forms or premeasured packaged portions of the other dosage forms.

The tablets may contain conventional tablet adjuvants such as binders, carriers, lubricating agents or other substances added to provide ease in tableting or in disintegration of the tablets. These adjuvants may include cornstarch, lactose, dicalcium phosphate, talc, stearic acid, magnesium stearate and gums. The tablets may be in the form of sustained or delayed release compositions provided by known methods involving the use of coatings to provide varying release rates.

The following examples are illustrative of the present invention.

Example I

To a mixture of 1.0 g. of anhydrous sodium carbonate in 50 ml. of ethanol is added 2.6 g. of 5-carbethoxy-4-chloro-2-phenylpyrimidine and 1.1 g. of methyl mercaptoacetate. The mixture is stirred and heated under reflux for two hours. On cooling the reaction mixture in ice, a crystalline product is deposited. The precipitate is removed by filtration, washed with water and crystallized from ethanol, affording 1.8 g. of the product, 4-carboxymethylthio-2-phenyl-5-pyrimidinecarboxylic acid, 4-methyl ester, 5-ethyl ester, M.P. 111–112° C.

Analysis.—Calcd. for $C_{16}H_{16}N_2SO_4$ (percent): C, 57.82; H, 4.85; N, 8.43; S, 9.65. Found (percent): C, 57.65; H, 4.87; N, 8.21; S, 9.42.

In a similar manner, using the appropriate starting materials, the following compounds are provided:

4-carboxymethylthio-2-methyl-5-pyrimidinecarboxylic acid, 4-butyl ester, 5-methyl ester;
4-carboxymethylthio-2-methoxymethyl-5-pyrimidinecarboxylic acid, 4-isopropyl ester, 5-propyl ester;
4-carboxymethylthio-2-(2-phenethyl)-5-pyrimidinecarboxylic acid, 4-ethyl ester, 5-butyl ester;
4-carboxymethylthio-2-(p-fluorophenyl)-5-pyrimidinecarboxylic acid, 4-propyl ester, 5-ethyl ester;
4-carboxymethylthio-2-methylthio-5-pyrimidinecarboxylic acid, 4-hexyl ester, 5-propyl ester;
4-carboxymethylthio-2-isopropyl-5-pyrimidinecarboxylic acid, 4-butyl ester, 5-ethyl ester;
2-(p-bromobenzyl)-4-carboxymethylthio-5-pyrimidinecarboxylic acid, 4-methyl ester, 5-propyl ester;
4-carboxymethylthio-2-propyl-5-pyrimidinecarboxylic acid, 4-isopropyl ester, 5-methyl ester;
4-carboxymethylthio-2-(p-tolyl)-5-pyrimidinecarboxylic acid, 4-ethyl ester, 5-methyl ester;
4-carboxymethylthio-2-(p-chlorophenyl)-5-pyrimidinecarboxylic acid, 4,5-diethyl ester;
4-carboxymethylthio-2-ethyl-5-pyrimidinecarboxylic acid, 4-butyl ester, 5-methyl ester;
4-carboxymethylthio-2-(2-methoxyethyl)-5-pyrimidinecarboxylic acid, 4-ethyl ester, 5-propyl ester;
2-(p-bromophenyl)-4-carboxymethylthio-5-pyrimidinecarboxylic acid, 4,5-dimethyl ester;
4-carboxymethylthio-2-(p-methoxyphenyl)-5-pyrimidinecarboxylic acid, 4-ethyl ester, 5-methyl ester;
4-carboxymethylthio-2-ethylthio-5-pyrimidinecarboxylic acid, 4-methyl ester, 5-butyl ester;
4-carboxymethylthio-2-ethoxyethyl-5-pyrimidinecarboxylic acid, 4-ethyl ester, 5-butyl ester;
4-carboxymethylthio-2-[2-(p-fluorophenyl)ethyl]-5-pyrimidinecarboxylic acid, 4-ethyl ester, 5-methyl ester;
4-carboxymethylthio-2-(p-iodophenyl)-5-pyrimidinecarboxylic acid, 4-methyl ester, 5-propyl ester;
4-carboxymethylthio-2-(3-phenpropyl)-5-pyrimidinecarboxylic acid, 4-methyl ester, 5-ethyl ester;
4-carboxymethylthio-2-propyl-5-pyrimidinecarboxylic acid, 4-propyl ester, 5-ethyl ester;
4-carboxymethylthio-2-(p-propoxyphenyl)-5-pyrimidinecarboxylic acid, 4-ethyl ester, 5-methyl ester;
4-carboxymethylthio-2-[2-(o-iodophenyl)ethyl]-5-pyrimidinecarboxylic acid, 4-ethyl ester, 5-butyl ester;
4-carboxymethylthio-2-methyl-5-pyrimidinecarboxylic acid, 4-ethyl ester, 5-methyl ester;
2-butyl-4-carboxymethylthio-5-pyrimidinecarboxylic acid, 4-methyl ester, 5-ethyl ester;
4-carboxymethylthio-2-[2-(p-chlorophenyl)ethyl]-5-pyrimidinecarboxylic acid, 4-ethyl ester, 5-propyl ester;
4-carboxymethylthio-2-(p-ethylphenyl)-5-pyrimidinecarboxylic acid, 4-methyl ester, 5-ethyl ester;
2-benzyl-4-carboxymethylthio-5-pyrimidinecarboxylic acid, 4-methyl ester, 5-ethyl ester.

Example II

A mixture of 2.6 g. of 5-carbethoxy-4-chloro-2-phenylpyrimidine, 1.67 g. of α-mercaptoacetanilide and 1.0 g. of anhydrous sodium carbonate in 50 ml. of ethanol is heated under reflux with stirring for two hours. The reaction mixture is cooled and filtered. The filter cake is washed with water and recrystallized from dimethylformamide-water, affording 2.6 g. of the product, 2-phenyl-4 - [(phenylcarbamoyl)methylthio]-5-pyrimidinecarboxylic acid, ethyl ester, M.P. 220–222° C.

*Analysis.*—Calcd. for $C_{21}H_{19}N_3O_3S$ (percent): C, 64.11; H, 4.87; N, 10.68; S, 8.15. Found (percent): C, 64.15; H, 4.99; N, 10.48; S, 8.00.

In a similar manner, using the appropriate starting materials, the following compounds are provided:

2-methyl-4-[(phenylcarbamoyl)methylthio]-5-pyrimidinecarboxylic acid, methyl ester;
2-(2-phenethyl)-4-[(phenylcarbamoyl)methylthio]-5-pyrimidinecarboxylic acid, butyl ester;
2-(p-fluorophenyl)-4-[(phenylcarbamoyl)methylthio]-5-pyrimidinecarboxylic acid, ethyl ester;
2-methylthio-4-[(phenylcarbamoyl)methylthio]-5-pyrimidinecarboxylic acid, propyl ester;
2-isopropyl-4-[(phenylcarbamoyl)methylthio]-5-pyrimidinecarboxylic acid, ethyl ester;
2-(p-bromobenzyl)-4-[(phenylcarbamoyl)methylthio]-5-pyrimidinecarboxylic acid, propyl ester;
4-[(phenylcarbamoyl)methylthio]-2-propyl-5-pyrimidinecarboxylic acid, methyl ester;
4-[(phenylcarbamoyl)methylthio]-2-(p-tolyl)-5-pyrimidinecarboxylic acid, methyl ester;
2-(p-chlorophenyl)-4-[(phenylcarbamoyl)methylthio]-5-pyrimidinecarboxylic acid, ethyl ester;
2-ethyl-4-[(phenylcarbamoyl)methylthio]-5-pyrimidinecarboxylic acid, methyl ester;
2-(2-methoxyethyl)-4-[(phenylcarbamoyl)methylthio]-5-pyrimidinecarboxylic acid, propyl ester;
2-(p-bromophenyl)-4-[(phenylcarbamoyl)methylthio]-5-pyrimidinecarboxylic acid, ethyl ester;
2-(p-methoxyphenyl)-4-[(phenylcarbamoyl)methylthio]-5-pyrimidinecarboxylic acid, methyl ester;
2-ethylthio-4-[(phenylcarbamoyl)methylthio]-5-pyrimidinecarboxylic acid, butyl ester;
2-ethyl-4-[(phenylcarbamoyl)methylthio]-5-pyrimidinecarboxylic acid, ethyl ester;
2-ethoxyethyl-4-[(phenylcarbamoyl)methylthio]-5-pyrimidinecarboxylic acid, butyl ester;
2-[2-(p-fluorophenyl)ethyl]-4-[(phenylcarbamoyl)methylthio]-5-pyrimidinecarboxylic acid, methyl ester;
2-(p-iodophenyl)-4-[(phenylcarbamoyl)methylthio]-5-pyrimidinecarboxylic acid, propyl ethyl;
2-(3-phenpropyl)-4-[(phenylcarbamoyl)methylthio]-5-pyrimidinecarboxylic acid, ethyl ester;
2-(p-propoxyphenyl)-4-[(phenylcarbamoyl)methylthio]-5-pyrimidinecarboxylic acid, methyl ester;
2-[2-(o-iodophenyl)ethyl]-4-[(phenylcarbamoyl)methylthio]-5-pyrimidinecarboxylic acid, butyl ester;
2-methyl-4-[(phenylcarbamoyl)methylthio]-5-pyrimidinecarboxylic acid, ethyl ester;
2-[2-(p-chlorophenyl)ethyl]-4-[(phenylcarbamoyl)methylthio]-5-pyrimidinecarboxylic acid, propyl ester;
2-(p-ethylphenyl)-4-[(phenylcarbamoyl)methylthio]-5-pyrimidinecarboxylic acid, ethyl ester;
2-benzyl-4-[(phenylcarbamoyl)methylthio]-5-pyrimidinecarboxylic acid, ethyl ester;
2-butyl-4-[(phenylcarbamoyl)methylthio]-5-pyrimidinecarboxylic acid, ethyl ester.

Example III

To a mixture of 2.1 g. of anhydrous sodium carbonate and 5.24 g. of 5-carbethoxy-4-chloro-2-phenylpyrimidine in 150 ml. of ethanol is added 4.3 g. of 2-mercapto-N-(2-naphthyl)-acetamide. The reaction mixture is heated under reflux with stirring for two hours, cooled and filtered. The filter cake is washed with water and recrystallized from aqueous dimethylformamide to give the product, 4-([2 - naphthyl)carbamoyl] - methylthio) - 2-phenyl-5-pyrimidinecarboxylic acid, ethyl ester; with the M.P. 225–227° C.

*Analysis.*—Calcd. for $C_{25}H_{21}N_3O_3S$ (percent): C, 67.70; H, 4.77; N, 9.47; S, 7.23. Found (percent): C, 67.54; H, 4.82; N, 9.57; S, 6.98.

In a similar manner, using the appropriate starting materials, the following compounds are provided:

2-methyl-4-([(2-naphthyl)carbamoyl]methylthio)-5-pyridiminecarboxylic acid, methyl ester;
2-methoxyethyl-4-([(2-naphthyl)carbamoyl]methylthio)-5-pyrimidinecarboxylic acid, propyl ester;
4-([(2-naphthyl)carbamoyl]methylthio)-2-(2-phenethyl)-5-pyrimidinecarboxylic acid, butyl ester;
2-(p-fluorophenyl)-4-([(2-naphthyl)carbamoyl]methylthio)-5-pyrimidinecarboxylic acid, ethyl ester;
2-methylthio-4-([(2-naphthyl)carbamoyl]methylthio)-5-pyrimidinecarboxylic acid, propyl ester;
2-isopropyl-4-([(2-naphthyl)carbamoyl]methylthio)-5-pyrimidinecarboxylic acid, ethyl ester;
2-(p-bromobenzyl)-4-([(2-naphthyl)carbamoyl]methylthio)-5-pyrimidinecarboxylic acid, propyl ester;
4-([(2-naphthyl)carbamoyl]methylthio)-2-propyl-5-pyrimidinecarboxylic acid, methyl ester;
4-([(2-naphthyl)carbamoyl]methylthio)-2-(p-tolyl)-5-pyrimidinecarboxylic acid, methyl ester;
2-(p-chlorophenyl)-4-([(2-naphthyl)carbamoyl]methylthio)-5-pyrimidinecarboxylic acid, ethyl ester;
2-ethyl-4-([(2-naphthyl)carbamoyl]methylthio)-5-pyrimidinecarboxylic acid, methyl ester;
2-(2-methoxyethyl)-4-([(2-naphthyl)carbamoyl]methylthio)-5-pyrimidinecarboxylic acid, propyl ester;
2-(p-bromophenyl)-4-([(2-naphthyl)carbamoyl]methylthio)-5-pyrimidinecarboxylic acid, ethyl ester;
2-(p-methoxyphenyl)-4-([(2-naphthyl)carbamoyl]methylthio)-5-pyrimidinecarboxylic acid, methyl ester;
2-ethylthio-4-([(2-naphthyl)carbamoyl]methylthio)-5-pyrimidinecarboxylic acid, butyl ester;
2-ethoxyethyl-4-([(2-naphthyl)carbamoyl]methylthio)-5-pyrimidinecarboxylic acid, butyl ester;
2-[2-(p-fluorophenyl)ethyl]-4-([(2-naphthyl)carbamoyl]-methylthio)-5-pyrimidinecarboxylic acid, methyl ester;
2-(p-iodophenyl)-4-([(2-naphthyl)carbamoyl]methylthio)-5-pyrimidinecarboxylic acid, propyl ester;
4-([(2-naphthyl)carbamoyl]methylthio)-2-(3-phenpropyl)-5-pyrimidinecarboxylic acid, ethyl ester;
4-([(2-naphthyl)carbamoyl]methylthio)-2-(p-propoxyphenyl)-5-pyrimidinecarboxylic acid, methyl ester;
2-[2-(o-iodophenyl)ethyl]-4-([(2-naphthyl)carbamoyl]-methylthio)-5-pyrimidinecarboxylic acid, butyl ester;
2-methyl-4-([(2-naphthyl)carbamoyl]methylthio)-5-pyrimidinecarboxylic acid, ethyl ester;
2-[2-(p-chlorophenyl)ethyl]-4-([(2-naphthyl)carbamoyl]-methylthio)-5-pyrimidinecarboxylic acid, propyl ester;
2-(p-ethylphenyl)-4-([(2-naphthyl)carbamoyl]methylthio)-5-pyrimidinecarboxylic acid, ethyl ester;
2-benzyl-4-([(2-naphthyl)carbamoyl]methylthio)-5-pyrimidinecarboxylic acid, ethyl ester;
2-butyl-4-([(2-naphthyl)carbamoyl]methylthio)-5-pyrimidinecarboxylic acid, ethyl ester.

Example IV

To a solution of 1.3 g. of sodium in 100 ml. of absolute methanol is added 18 g. of 4-carboxymethylthio-2-phenyl-5-pyrimidinecarboxylic acid, 4-methyl ester, 5-ethyl ester. The reaction mixture is heated with stirring under reflux for four hours. The reaction mixture is then cooled in ice and acidified with glacial acetic acid. The precipitate which results is removed by filtration and washed with with water (3 × 25 ml.). The product, 5-hydroxy-2-phenylthieno[2,3-d]pyrimidine-6-carboxylic acid, methyl ester amounts to 18.0 g., M.P. 184–187° C. The analytical sample was obtained by recrystallization from methanol, M.P. 196–198° C.

*Analysis.*—Calcd. for $C_{14}H_{10}N_2SO_3$ (percent): C, 58.72; H, 3.52; N, 9.78; S, 11.20. Found (percent): C, 58.77; H, 3.38; N, 9.88; S, 11.43.

In a similar manner, using the appropriate starting materials, the following compounds are provided:

5-hydroxy-2-methylthieno[2,3-d]pyrimidine-6-carboxylic acid, butyl ester;

2-(p-fluorophenyl)-5-hydroxythieno[2,3-d]pyrimidine-
  6-carboxylic acid, propyl ester;
2-(p-bromobenzyl)-5-hydroxythieno[2,3-d]pyrimidine-
  6-carboxylic acid, methyl ester;
2-(p-chlorophenyl)-5-hydroxythieno[2,3-d]pyrimidine-
  6-carboxylic acid, ethyl ester;
2-(p-bromophenyl)-5-hydroxythieno[2,3-d]pyrimidine-
  6-carboxylic acid, methyl ester;
2-ethyl-5-hydroxythieno[2,3-d]pyrimidine-6-carboxylic
  acid, butyl ester;
5-hydroxy-2-(p-iodophenyl)thieno[2,3-d]pyrimidine-
  6-carboxylic acid, methyl ester;
5-hydroxy-2-(p-propoxyphenyl)thieno[2,3-d]pyrimidine-
  6-carboxylic acid, ethyl ester;
2-butyl-5-hydroxythieno[2,3-d]pyrimidine-6-carboxylic
  acid, methyl ester;
2-benzyl-5-hydroxythieno[2,3-d]pyrimidine-6-carboxylic
  acid, methyl ester.

Example V

To a solution of 0.18 g. of sodium in 50 ml. of dry 2-ethoxyethanol is added 3.0 g. of 2-phenyl-4-[(phenylcarbamoyl) - methylthio] - 5 - pyrimidinecarboxylic acid, ethyl ester. The mixture is heated under reflux with stirring for two hours. After allowing the reaction mixture to cool to room temperature, water (50 ml.) is added. Enough hydrochloric acid (30%) is added to make the mixture slightly acidic. The solid product is removed by filtration. The filter cake is recrystallized from dimethylformamide, giving 1.5 g. of the product, 5-hydroxy-2-phenylthieno[2,3-d]pyrimidine-6-carboxanilide, M.P. 272–274° C. (decomposition).

Analysis.—Calcd. for $C_{19}H_{13}N_3O_2S$ (percent): C, 65.69; H, 3.77; N, 12.10; S, 9.23. Found (percent): C, 65.43; H, 3.93; N, 11.85; S, 9.16.

In a similar manner, using the appropriate starting materials, the following compounds are produced:

5-hydroxy-2-(methoxyethyl)thieno[2,3-d]pyrimidine-
  6-carboxanilide;
5-hydroxy-2-(methylthio)thieno[2,3-d]pyrimidine-6-
  carboxanilide;
2-ethyl-5-hydroxythieno[2,3-d]pyrimidine-6-carboxanilide;
5-hydroxy-2-(p-methoxyphenyl)thieno[2,3-d]pyrimidine-6-carboxanilide;
2-ethoxyethyl-5-hydroxythieno[2,3-d]pyrimidine-6-
  carboxanilide;
5-hydroxy-2-(3-phenpropyl)thieno[2,3-d]pyrimidine-
  6-carboxanilide;
5-hydroxy-2-[2-(o-iodophenyl)ethyl]thieno[2,3-d]
  pyrimidine-6-carboxanilide;
2-[2-(p-chlorophenyl)ethyl]-5-hydroxythieno[2,3-d]
  pyrimidine-6-carboxanilide.

Example VI

To a solution of 0.27 g. of sodium in 75 ml. of anhydrous 2-ethoxyethanol is added 2.8 g. of 4-([(2-naphthyl)carbamoyl]methylthio) - 2-phenyl-5-pyrimidinecarboxylic acid, ethyl ester. The mixture is heated under reflux for four hours. The reaction mixture is cooled to room temperature and poured into 150 ml. of water and acidified with glacial acetic acid. The final product recrystallized from dimethylformamide is 5-hydroxy-N-(2-naphthyl)-2 - phenylthieno[2,3-d]pyrimidine-6-carboxamide.

In a similar manner, using the appropriate starting materials, the following compounds are prepared:

5-hydroxy-N-(2-naphthyl)-2-(2-phenethyl)thieno[2,3-
  d]pyrimidine-6-carboxamide;
5-hydroxy-2-isopropyl-N-(2-naphthyl)thieno[2,3-d]
  pyrimidine-6-carboxamide;
5-hydroxy-N-(2-naphthyl)-2-(p-tolyl)thieno[2,3-d]
  pyrimidine-6-carboxamide;
5-hydroxy-2-(2-methoxyethyl)-N-(1-naphthyl)thieno
  [2,3-d]pyrimidine-6-carboxamide;
2-ethylthio-5-hydroxy-N-(2-naphthyl)thieno[2,3-d]
  pyrimidine-6-carboxamide;
2-[2-(p-fluorophenyl)ethyl]-5-hydroxy-N-(2-naphthyl)
  thieno[2,3-d]pyrimidine-6-carboxamide;
5-hydroxy-2-(2-propyl)-N-(1-naphthyl)thieno[2,3-d]
  pyrimidine-6-carboxamide;
2-(p-ethylphenyl)-5-hydroxy-N-(2-naphthyl)thieno
  [2,3-d]pyrimidine-6-carboxamide.

Example VII

To a solution of 1.4 g. of 5-hydroxy-2-phenylthieno[2,3-d]pyrimidine-6-carboxylic acid, methyl ester in 20 ml. of dry pyridine is added 0.95 g. of p-toluenesulfonyl chloride. The reaction mixture is kept at room temperature for one hour and then is poured into 200 ml. of water. The colorless precipitate which deposits is collected by filtration. Recrystallization from dimethylformamide affords 1.8 g. of the product, 5-hydroxy-2-phenylthieno[2,3-d]pyrimidine-6-carboxylic acid, methyl ester, p-toluenesulfonate; M.P. 218–220° C.

Analysis.—Calcd. for $C_{21}H_{16}N_2O_5S_2$ (percent): C, 57.26; H, 3.66; N, 6.36; S, 14.56. Found (percent): C, 57.08; H, 3.91; N, 6.06; S, 14.62.

In a similar manner, using the appropriate starting materials, the following compounds are produced:

5-hydroxy-2-phenylthieno[2,3-d]pyrimidine-6-carboxanilide, methylsulfonate;
5-hydroxy-N-(2-napthyl)-2-phenylthieno[2,3-d]pyrimidine-6-carboxamide, p-bromophenylsulfonate;
5-hydroxy-2-methylthieno[2,3-d]pyrimidine - 6-carboxylic acid, butyl ester, phenylsulfonate;
5-hydroxy-2-(methoxyethyl)thieno[2,3-d]pyrimidine-
  6-carboxanilide, ethylsulfonate;
5-hydroxy-N-(2-naphthyl)-2-(2-phenethyl)thieno[2,3-
  d]pyrimidine-6-carboxamide, ethylsulfonate;
2-(p-fluorophenyl)-5-hydroxythieno[2,3-d]pyrimidine-
  6-carboxylic acid, propyl ester, ethylsulfonate;
5-hydroxy-2-(methylthio)thieno[2,3-d]pyrimidine-6-
  carboxanilide, 2-(p-fluorophenyl)ethtylsulfonate;
5-hydroxy-2-isopropyl-N-(2-naphthyl)thieno[2,3-d]
  pyrimidine-6-carboxamide, p-methoxyphenylsulfonate;
2-(p-bromobenzyl)-5-hydroxythieno[2,3-d]pyrimidine-
  6-carboxylic acid, methyl ester, o-toluenesulfonate;
2-ethyl-5-hydroxythieno[2,3-d]pyrimidine-6-carboxanilide, 3-(p-bromophenyl)propylsulfonate;
5-hydroxy-N-(2-naphthyl)-2-(p-tolyl)-thieno[2,3-d]
  pyrimidine-6-carboxamide, ethylsulfonate;
2-(p-chlorophenyl)-5-hydroxythieno[2,3-d]pyrimidine-
  6-carboxylic acid, ethyl ester, benzylsulfonate;
2-ethyl-5-hydroxythieno[2,3-d]pyrimidine-6-carboxanilide, ethylsulfonate;
5-hydroxy-2-(2-methoxyethyl)-N-(1-naphthyl)thieno
  [2,3-d]pyrimidine-6-carboxamide, methylsulfonate;
2-(p-bromophenyl)-5-hydroxythieno[2,3-d]pyrimidine-
  6-carboxylic acid, methyl ester, 2-phenylethylsulfonate;
5-hydroxy-2-(p-methoxyphenyl)thieno[2,3-d]pyrimidine-6-carboxanilide, o-iodophenylsulfonate;
2-ethylthio-5-hydroxy-N-(2-naphthyl)thieno[2,3-d]
  pyrimidine-6-carboxamide, propylsulfonate;
2-ethyl-5-hydroxythieno[2,3-d]pyrimidine-6-carboxylic
  acid, butyl ester, m-toluenesulfonate;
2-ethoxyethyl-5-hydroxythieno[2,3-d]pyrimidine-6-carboxanilide, 3-phenpropylsulfonate;
2-[2-(p-fluorophenyl)ethyl]-5-hydroxy-N-(2-naphthyl)
  thieno[2,3-d]pyrimidine-6-carboxamide, propylsulfonate;
5-hydroxy-2-(p-iodophenyl)thieno[2,3-d]pyrimidine-6-
  carboxylic acid, methyl ester, isopropylsulfonate;
5-hydroxy-2-(3-phenpropyl)thieno[2,3-d]pyrimidine-6-
  carboxanilide, p-propoxyphenylsulfonate;
5-hydroxy-2-methyl-N-(1-naphthyl)thieno[2,3-d]pyrimidine-6-carboxamide, o-iodobenzylsulfonate;
5-hydroxy-2-(p-propoxyphenyl)thieno[2,3-d]pyrimidine-6-carboxylic acid, ethyl ester, ethylsulfonate;

5-hydroxy-2-[2-(o-iodophenyl)ethyl]thieno[2,3-d]-
 pyrimidine-6-carboxanilide, p-chlorobenzylsulfonate;
2-ethyl-5-hydroxy-N-(2-naphthyl)thieno[2,3-d]pyrim-
 idine-6-carboxamide, ethylsulfonate;
2-butyl-5-hydroxythieno[2,3-d]pyrimidine-6-carboxylic
 acid, methyl ester, p-chlorophenylsulfonate;
2-[2-(p-chlorophenyl)ethyl]-5-hydroxythieno[2,3-d]-
 pyrimidine-6-carboxanilide, p-ethylphenylsulfonate;
2-(p-ethylphenyl)-5-hydroxy-N-(2-naphthyl)thieno[2,3-
 d]pyrimidine-6-carboxamide, p-fluorophenylsulfonate;
2-benzyl-5-hydroxythieno[2,3-d]pyrimidine-6-carboxylic
 acid, methyl ester, butylsulfonate.

What is claimed is:

1. A compound selected from the group having the formula:

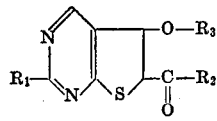

wherein $R_1$ is selected from the group consisting of phenyl, lower alkylphenyl and phen(lower)alkyl; $R_2$ is selected from the group consisting of lower alkoxy, anilino and naphthylamino; and $R_3$ is selected from the group consisting of hydrogen, lower alkylphensulfonyl, phenylsulfonyl, phen(lower)alkylsulfonyl and lower alkylsulfonyl.

2. A compound as described in claim 1 which is: 5-hydroxy - 2 - phenylthieno[2,3-d]pyrimidine - 6 - carboxylic acid, methyl ester.

3. A compound as described in claim 1 which is: 5-hydroxy - 2 - phenylthieno[2,3-d]pyrimidine - 6 - carboxylic acid, methyl ester, p-toluenesulfonate.

4. A compound as described in claim 1 where is: 5-hydroxy - 2 - phenylthieno[2,3-d]pyrimidine - 6 carboxanilide.

5. A method of preparing a compound having the formula:

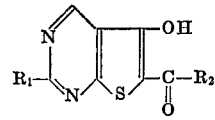

wherein $R_1$ is selected from the group consisting of phenyl, lower alkylphenyl and phen(lower)alkyl; and $R_2$ is selected from the group consisting of lower alkoxy, anilino and naphthylamino, which comprises contacting a compound

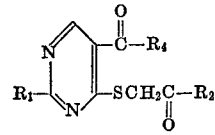

wherein $R_1$ and $R_2$ are as set forth above and $R_4$ is lower alkoxy, by heating at about reflux temperature for a period of time ranging from about one hour up to about six hours, with a strong base selected from the group consisting of alkali metal (lower)alkoxides in a reaction inert organic solvent.

References Cited

Shvedov et al.: C. A. 68, 59519h (1968).

ALEX MAZEL, Primary Examiner

R. V. RUSH, Assistant Examiner

U.S. Cl. X.R.

260—251 R, 256.5 R; 424—251